(12) United States Patent
Chen et al.

(10) Patent No.: US 8,179,845 B2
(45) Date of Patent: May 15, 2012

(54) ANTENNA-AWARE METHOD FOR TRANSMITTING PACKETS IN A WIRELESS COMMUNICATION NETWORK

(75) Inventors: Ye Chen, Elk Grove Village, IL (US); Stephen P. Emeott, Rolling Meadows, IL (US); Isam R. Makhlouf, Lake Zurich, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 920 days.

(21) Appl. No.: 12/196,010

(22) Filed: Aug. 21, 2008

(65) Prior Publication Data

US 2010/0046439 A1 Feb. 25, 2010

(51) Int. Cl.
*G06F 15/16* (2006.01)
(52) U.S. Cl. ........ 370/329; 370/311; 370/328; 370/332; 370/338
(58) Field of Classification Search ................. 370/329
See application file for complete search history.

(56) References Cited

U.S. PATENT DOCUMENTS

| 7,047,046 | B2 | 5/2006 | Hoffmann et al. |
| 7,061,925 | B2 | 6/2006 | Joshi |
| 7,075,902 | B2 | 7/2006 | El Batt |
| 7,103,386 | B2 | 9/2006 | Hoffmann et al. |
| 7,359,679 | B2 | 4/2008 | King et al. |
| 2006/0098611 | A1 | 5/2006 | Joshi et al. |
| 2006/0098612 | A1 | 5/2006 | Joshi et al. |
| 2006/0221920 | A1 | 10/2006 | Gopalakrishnan et al. |
| 2007/0002820 | A1 | 1/2007 | Xhafa |
| 2007/0060141 | A1* | 3/2007 | Kangude et al. ............ 455/445 |
| 2007/0210974 | A1* | 9/2007 | Chiang ...................... 343/757 |
| 2008/9019270 | | 8/2008 | Xhafa et al. |
| 2008/0261658 | A1* | 10/2008 | Jin et al. .................... 455/562.1 |

OTHER PUBLICATIONS

R. R. Choudhury et al., "On Designing MAC Protocols for Wireless Networks Using Directional Antennas", IEEE Trans. Mobile Computing, vol. 5, No. 5, May 2006—pp. 477-491 (Relevant pages: Chapter 5, p. 479 through Chapter 7.3.2, p. 487).
Corresponding International Patent No. PCT/US2009/052620—International Search Report with Written Opinion with mailing date Mar. 15, 2010.

* cited by examiner

*Primary Examiner* — Jeffrey Pwu
*Assistant Examiner* — Sulaiman Nooristany
(74) *Attorney, Agent, or Firm* — Randi L. Karpinia

(57) ABSTRACT

A method for transmitting packets in a wireless communication network includes taking into consideration an antenna mode prior to transmission. The method includes determining a transmit antenna mode for a transmission between the node and at least one other node; when the transmit antenna mode is omni-directional, broadcasting a transmission schedule for the transmission omni-directionally; and when the transmit antenna is beamforming directional, broadcasting a transmission schedule for the transmission directionally on one or more transmitter beams. The method optionally can also take into consideration an antenna mode of a receive antenna between the node.

8 Claims, 8 Drawing Sheets

ANTENNA-AWARE METHOD FOR TRANSMITTING PACKETS IN A WIRELESS COMMUNICATION NETWORK

FIELD OF THE DISCLOSURE

The present disclosure relates generally to wireless communication networks and more particularly to an antenna-aware method to transmit packets in a Wireless Communication Network.

BACKGROUND

A Wireless Local Area Network (WLAN) is a Local Area Network (LAN) that employs wireless communication such as radio frequency (RF) or infrared (IR) transmission. A WLAN typically comprises fixed-location transceivers known as access points (APs) to which client devices connect via RF technology. The access points typically are hard wired to switches and routers that interconnect them and provide access to servers. The APs are fitted with radio transceivers and omnidirectional antennas. The client transceivers, or network adapters, may be in the form of Personal Computer Memory Card International Association (PCMCIA) cards, for example. The APs are located at central points where there is good line of sight (LOS) to the client devices and link quality, therefore, is best. Most WLANs are standards-based versions from the IEEE 802.11 Working Group. (For any IEEE standards recited herein, see: http://standards.ieee.org/getieee802/index.html or contact the IEEE at IEEE, 445 Hoes Lane, PO Box 1331, Piscataway, N.J. 08855-1331, USA.)

A wireless mesh network is a collection of wireless nodes or devices organized in a decentralized manner to provide range extension by allowing nodes to be reached across multiple hops. In a multi-hop network, communication packets sent by a source node can be relayed through one or more intermediary nodes before reaching a destination node. A large network can be realized using intelligent access points (IAP) which provide wireless nodes with access to a wired backhaul. A mesh network therefore typically comprises one or more IAPs (Intelligent Access Points), and a number of APs (Access Points), which provide data service to STAs (subscriber stations). An AP can connect to IAP directly or through multi-hop route.

A key aspect for optimal performance of a WLAN mesh network is controlling and coordinating the transmissions from different devices to minimize interference and collisions among the devices of the mesh network. To do so, in one method incorporating Scheduled Mesh Access (SMA), nodes transmitting data at known intervals advertise the timing of future transmissions to all nearby nodes that implement scheduled mesh access (SMA). The SMA mechanism reserves time on a media for future transmissions, and then accesses the media at reserved times using 802.11 channel access procedures. Further details of scheduled mess access operation, for example, can be found in United States Patent Publication Number 20090052463 entitled "Method Of Communicating Within A Mesh Network," filed on Aug. 24, 2007, assigned to the assignee of the present invention, and herein incorporated by reference in its entirety.

Advertisements may be broadcast to indicate when the channel will be busy. This can prevent nearby nodes implementing scheduled mesh access from accessing the channel at reserved times, thereby reducing collisions on the wireless LAN channel. Advertisements, such as messages advertising when a node is going to be sending or receiving traffic or advertising when a node expects its neighbors to send or receive traffic, are typically broadcast to mesh neighbors in management frames, a technique which works well when the omni-directional range of a node is large enough to reach all the neighbors of a node. However, if some nodes employ advanced antenna techniques, such as beamforming, to improve link rates or extend range, the advertisements broadcast to all neighbors via omni-directional antennas may not reach all of the neighbors that could be impacted by the beamforming-based data transmission.

Accordingly, there is a need for antenna-aware method to transmit packets in a WLAN mesh network.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
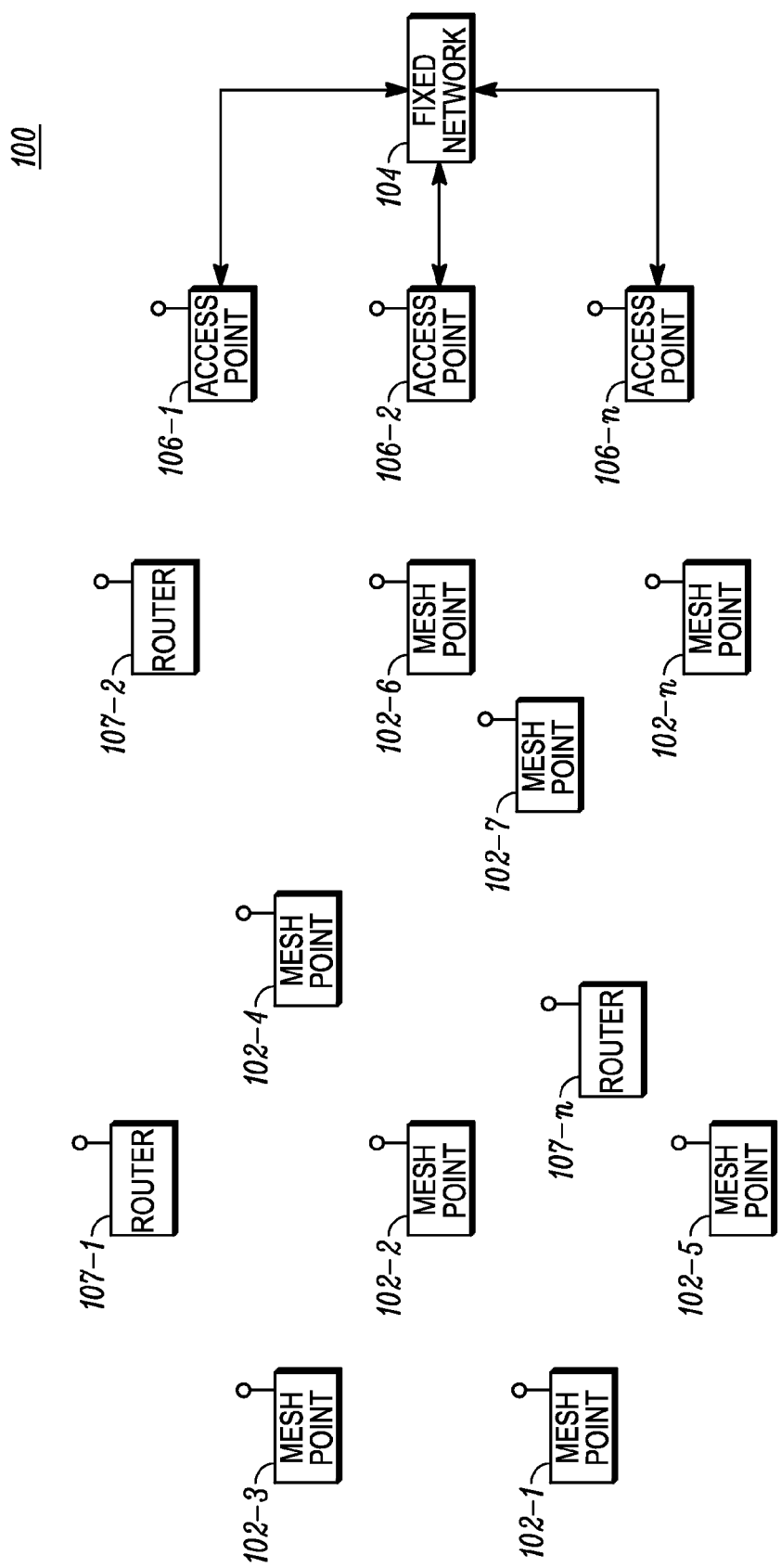
FIG. 1 is a block diagram illustrating an example of a communication network.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

The present invention provides an antenna-aware method to transmit packets in a Mesh Network resulting in a solution to typical interference problems for a Mesh Network when mesh points (MPs) in the Mesh have the beamforming capability. The present invention relies on the communication/interaction among MPs in the mesh system to efficiently minimize the interference when MPs employ beamforming for the transmission at mesh link.

FIG. 1 is a block diagram illustrating an example of a communication network 100. The communication network 100 can be any ad hoc network including a mesh enabled architecture (MEA) network, an IEEE 802.11 network (i.e. 802.11a, 802.11b, 802.11g, 802.11e or 802.11s), or any other packetized mesh communication network. As used herein, the term "ad hoc network" refers to a self-configuring network of nodes connected by wireless links, the union of which form an arbitrary topology.

As illustrated in FIG. 1, the communication network 100 includes a plurality of mobile nodes 102-1 through 102-n

(referred to also as mesh nodes 102, mesh points 102, nodes 102, mobile nodes 102, or mobile communication devices 102).

The communication network 100 can, but is not required to, include a fixed network 104 having a plurality of intelligent access points (IAP) 106-1, 106-2, ... 106-n (referred to generally as nodes 106 or access points 106), for providing nodes 102 with access to the fixed network 104. The fixed network 104 can include, for example, a core local access network (LAN), and a plurality of servers and gateway routers to provide network nodes with access to other networks, such as other ad-hoc networks, a public switched telephone network (PSTN) and the Internet.

As used herein, the term "Access Point (AP)" refers to a device communicatively connected either directly (via a wired link) or indirectly (via a wireless link) to a wired network that enables remote wireless nodes to communicate with the wired network (e.g. local area network (LAN), wide area network (WAN), etc.). An AP connects wireless communication devices which are in its direct communication range (i.e. one-hop away) together to form a wireless network. In many cases, the AP connects to a wired network, and can relay data between wireless devices and wired devices. In one implementation, an AP comprises a Mesh Access Point (MAP) which has meshing capability. A MAP is distinguishable from a regular AP in that an MAP implements a mesh routing protocol such as a Mesh Scalable Routing (MSR) protocol disclosed in U.S. Pat. No. 7,061,925 B2, to Avinash Joshi, entitled "System and Method for Decreasing Latency in Locating Routes Between Nodes in a Wireless Communication Network," its contents being incorporated by reference in its entirety herein. An Intelligent Access Point (IAP) is a special MAP which connects to a wide area wired network (WAN) and can relay data between the wireless devices and the wired devices on the WAN. IAPs and MAPs can enable communication between the wired network and remote wireless nodes which are multi-hop away through the MSR and its proxy routing variant as disclosed in United States Patent Application Publication Number 20060098612, to Joshi et al, entitled "System and method for associating different types of nodes with access point nodes in a wireless network to route data in the wireless network", and United States Patent Application Publication Number 20060098611, to Joshi et al, entitled "System and method for routing data between different types of nodes in a wireless network," the contents of each being incorporated by reference herein.

The communication network 100 further can include a plurality of fixed or mobile routers 107-1 through 107-n (referred to generally as nodes 107 or communication devices 107) for routing data packets between other nodes 102, 106 or 107. It is noted that for purposes of this discussion, the nodes discussed above can be collectively referred to as "nodes 102, 106 and 107", or simply "nodes" or alternatively as "communication devices."

As can be appreciated by one skilled in the art, the nodes 102, 106 and 107 are capable of communicating with each other directly or indirectly. When communicating indirectly, one or more other nodes 102, 106 or 107, can operate as a router or routers for forwarding or relaying packets being sent between nodes. As used herein, the term "meshed node" refers to a communication device which has "meshing capability" meaning that a node has routing functionality and can route traffic to and from other nodes with routing functionality. Examples of meshed nodes include a mesh point (MP), a Mesh Access Point (MAP), and an intelligent Access Point (IAP).

Figure 2:
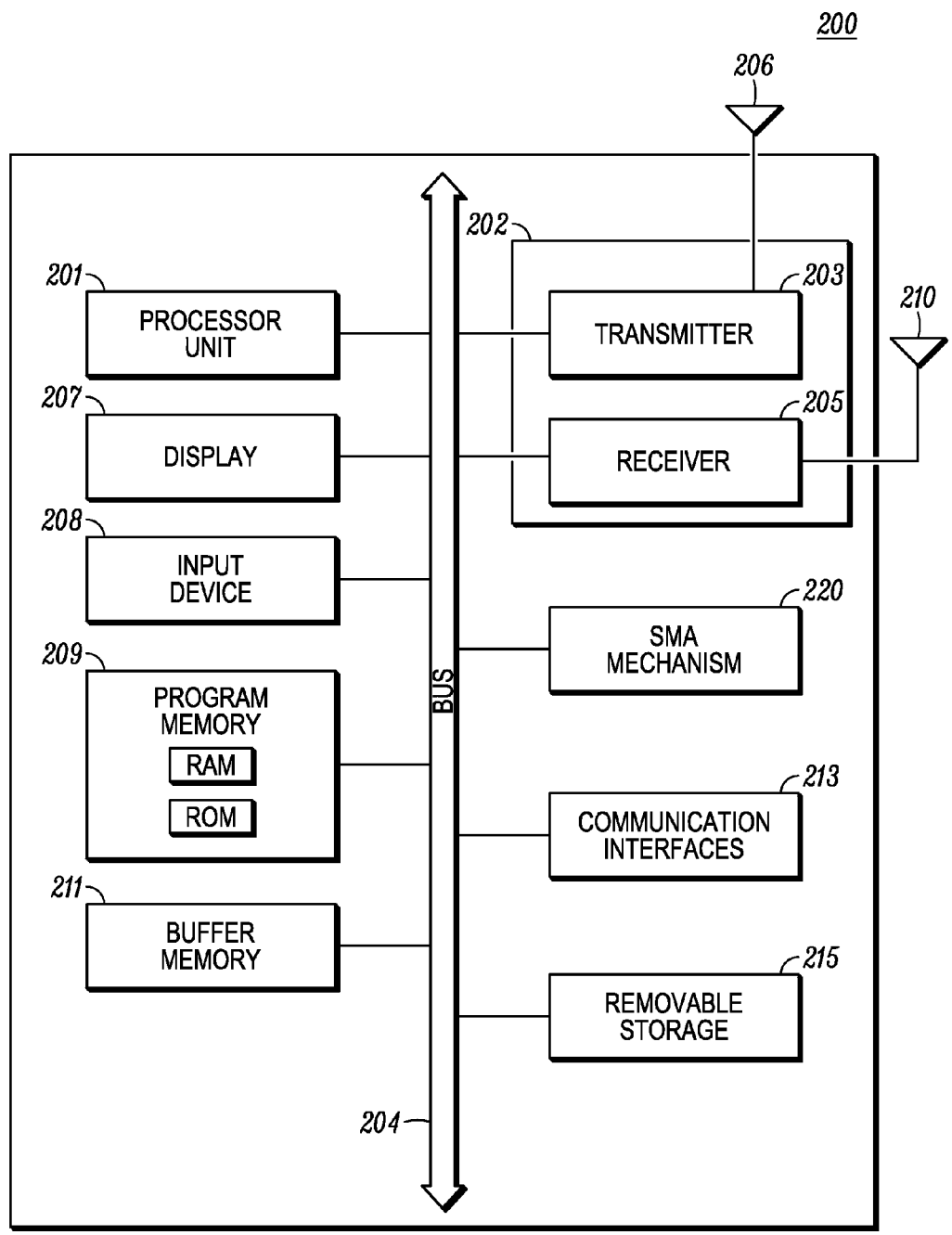
FIG. 2 is an electronic block diagram of a node for use in the operation of some embodiments of the invention.

FIG. 2 is a block diagram of a node 200. The node 200, for example can be one or more of the nodes 102, 106 or 107 of FIG. 1. The node 200 comprises a processor 201, a transceiver 202 including a transmitter circuitry 203 and a receiver circuitry 205, a transmit (Tx) antenna 206, a receive (Rx) antenna 210, a display 207, an input device 208, a program memory 209 for storing operating instructions that are executed by the processor 201, a buffer memory 211, one or more communication interfaces 213, a removable storage unit 215, and a scheduled mesh access (SMA) mechanism 220. Although not shown, the node 200 also can include one or more of an antenna switch, duplexer, circulator, or other highly isolative means (not shown) for intermittently providing information packets from the transmitter circuitry 203 to the transmit antenna 206 and from the receive antenna 210 to the receiver circuitry 205. The node 200, for example, can be an integrated unit containing at least all the elements depicted in FIG. 2, as well as any other elements necessary for the node 200 to perform its particular functions. Alternatively, the node 200 can comprise a collection of appropriately interconnected units or devices, wherein such units or devices perform functions that are equivalent to the functions performed by the elements of the node 200. For example, the node 200 may comprise a laptop computer coupled to a wireless local area network (LAN) card.

The processor 201 includes one or more microprocessors, microcontrollers, DSPs (digital signal processors), state machines, logic circuitry, or any other device or devices that process information based on operational or programming instructions. Such operational or programming instructions are stored in the program memory 209. The program memory 209 may be an IC (integrated circuit) memory chip containing any form of RAM (random-access memory) or ROM (read-only memory), a floppy disk, a CD-ROM (compact disk read-only memory), a hard disk drive, a DVD (digital video disc), a flash memory card or any other medium for storing digital information. One of ordinary skill in the art will recognize that when the processor 201 has one or more of its functions performed by a state machine or logic circuitry, the memory 209 containing the corresponding operational instructions may be embedded within the state machine or logic circuitry. The operations performed by the processor 201 and the rest of the node 200 are described in detail below.

The transmitter circuitry 203 and the receiver circuitry 205 enable the node 200 to communicate information packets to and acquire information packets from the other nodes. In this regard, the transmitter circuitry 203 and the receiver circuitry 205 include conventional circuitry to enable digital or analog transmissions over a wireless communication channel. The transmitter circuitry 203 and the receiver circuitry 205 are designed to operate over both a cellular air interface (e.g., Global System for Mobile communication (GSM), Code Division Multiple Access (CDMA), Wide-band CDMA (WCDMA), Universal Mobile Telecommunications System (UMTS), and the like) and an ad hoc networking air interface (e.g., BLUETOOTH, 802.11 WLAN (wireless local area network), 802.16 WiMax (Worldwide Interoperability for Microwave Access), and the like)

The implementations of the transmitter circuitry 203 and the receiver circuitry 205 depend on the implementation of the node 200. For example, the transmitter circuitry 203 and the receiver circuitry 205 can be implemented as an appropriate wireless modem, or as conventional transmitting and receiving components of two-way wireless communication devices. In the event that the transmitter circuitry 203 and the receiver circuitry 205 are implemented as a wireless modem, the modem can be internal to the node 200 or insertable into the node 200 (e.g., embodied in a wireless radio frequency (RF) modem implemented on a Personal Computer Memory Card International Association (PCMCIA) card). For a wireless communication device, the transmitter circuitry 203 and the receiver circuitry 205 can be implemented as part of the wireless device hardware and software architecture in accordance with known techniques. Most, if not all, of the functions of the transmitter circuitry 203 and/or the receiver circuitry 205 may be implemented in a processor, such as the processor 201. However, the processor 201, the transmitter circuitry 203, and the receiver circuitry 205 have been artificially partitioned herein to facilitate a better understanding.

The receiver circuitry 205 is designed to allow receiving of radio frequency (RF) signals from within at least one bandwidth and optionally more bandwidths, if the communications with the proximate device are in a frequency band other than that of the network communications. The receiver circuitry 205 may optionally comprise a first receiver and a second receiver, or one receiver designed to allow receiving within one or more bandwidths. The transceiver 202 includes at least one set of transmitter circuitry 203. The at least one transmitter 203 may be designed to allow transmitting to multiple devices on multiple frequency bands. As with the receiver 205, dual transmitters 203 may optionally be employed where one transmitter is for the transmission to a proximate node or direct link establishment to WLAN's and the other transmitter is for transmission to a cellular base station.

The transmit antenna 206 and the receive antenna 210 comprise any known or developed structure for radiating and receiving electromagnetic energy in the frequency range containing the wireless carrier frequencies. Although illustrated as two separate antennas, it will be appreciated that alternatively the node 200 can include on integrated antenna operating both as a receive and transmit antenna.

The buffer memory 211 may be any form of volatile memory, such as RAM, and is used for temporarily storing received information packets in accordance with the present invention.

The scheduled mesh access mechanism 220 provides channel access for the node 200. There are two types of scheduled access advertisements, namely advertisements for reserved intervals of time in the future where a node is either a sender or a receiver of traffic (called a Tx-Rx report) and advertisements for future intervals of time when a node expects its neighbors to send or receive traffic based upon the Tx-Rx reports it has received (called an interference report). The term advertisement as used herein corresponds to a Tx-Rx report unless otherwise noted.

Figure 3:
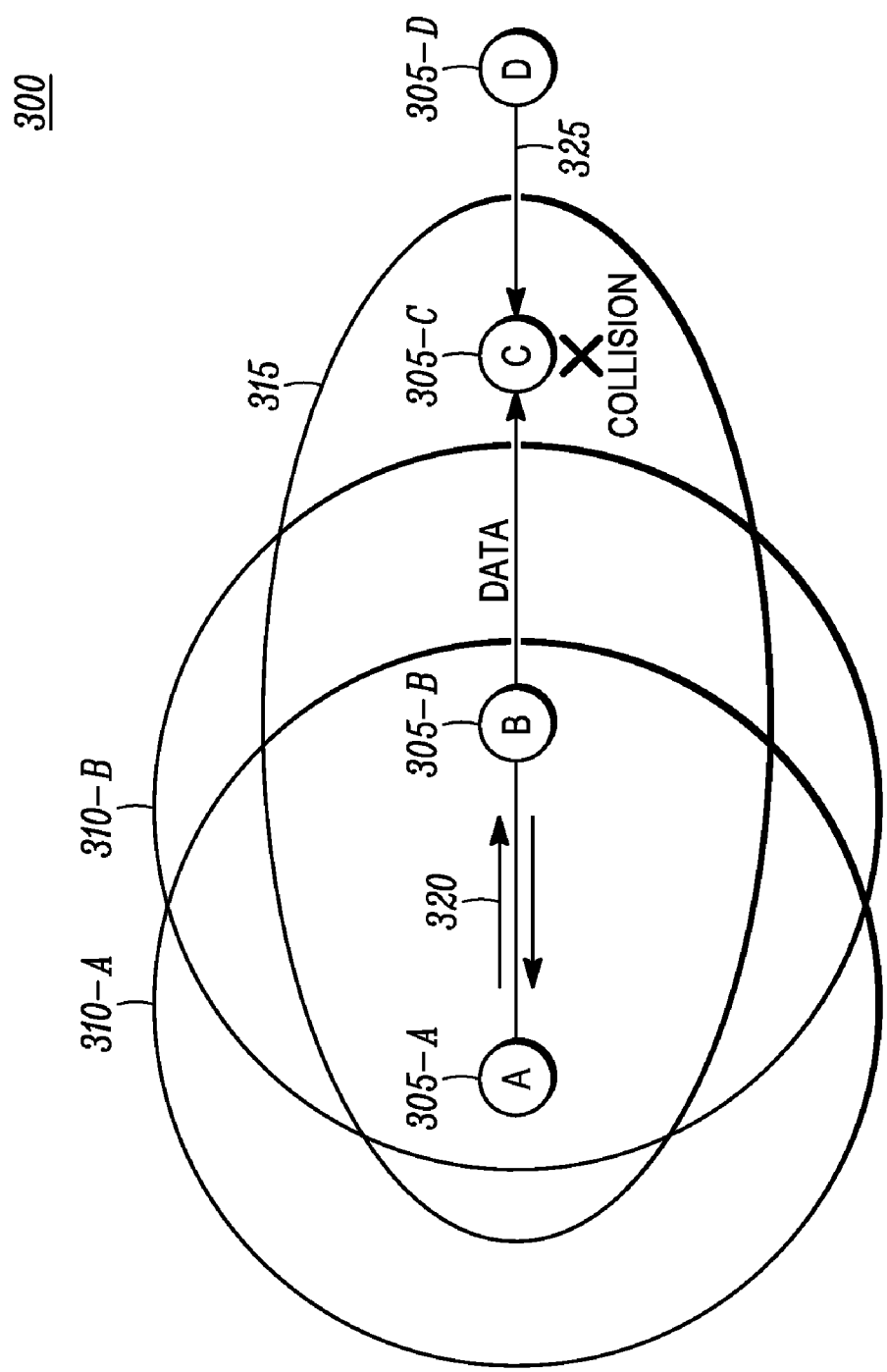
FIGS. 3 and 4 illustrate communication among nodes within the communication network of FIG. 1.

FIG. 3 illustrates the operation of nodes within a communication network 300 such as the communication network 100 of FIG. 1 in which the nodes are using broadcast advertisement to propagate the transmission information for beamforming data transmission.

As illustrated in FIG. 3, two nodes (Node C 305-C and node D 305-D) are outside the omni-directional range 310-A of the sender (node A 305-A) and the omni-directional range 310-B of the receiver (node B 305-B). However, node C 305-C is within the beamforming range 315 of node A 305-A. The advertisement transmitted via an omni antenna from both nodes A 305-A and B 305-B will not reach node C 305-C. When node A 305-A starts transmitting data to node B 305-B on the beam 320, the data transmission may collide with a transmission 325 from node D 305-D to node C 305-C occurring at the same time, since node C 305-C is within range of the beam 320 used by node A 305-A to transmit data.

Figure 4:
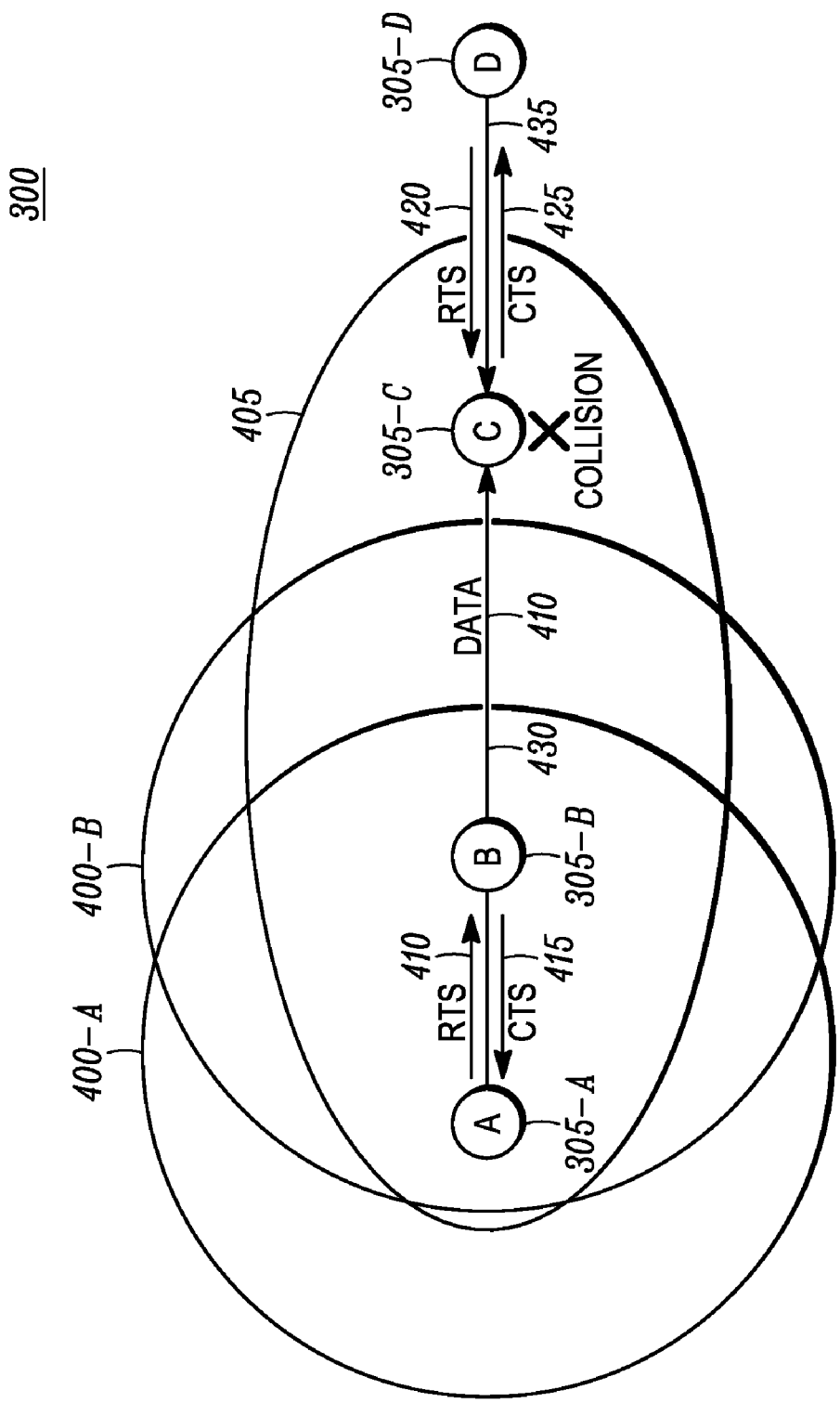

FIG. 4 illustrates the operation of nodes within a communication network 300 such as the communication network 100 of FIG. 1 in which the nodes are using omni request to send (RTS)/clear to send (CTS) to propagate the NAV for beamforming data transmission.

As illustrated in FIG. 4, two nodes (Node C 305-D and node D 305-D) are outside the omni-directional RTS/CTS range 400-A of the sender (node A 305-A) and the omni-directional RTS/CTS range 400-B of the receiver (node B 305-B). However, node C 305-C is within the beamforming range 405 of node A 305-A. The omni-based RTS/CTS between node A 305-A and node B 305-B will not provide the transmission information for node C 305-C.

For example, as illustrated in FIG. 4, while node A 305-A and node B 305-B exchanges a request to send RTS 410 and clear to send CTS 415, node C 305-C could also exchange a request to send RTS 420 and clear to send CTS 425 with node D 305-D for a frame exchange. The two RTS/CTS pairs will not interfere with each other. When node A 305-A thereafter transmits data 430 to node B 305-B, it will collide with the transmission of data 435 from node D 305-D to node C 305-C since node C 305-C is within the beamforming range 405 of node A 305-A.

In another example, a similar interference would result when node D 305-D also uses beamforming to transmit to node C 305-C. This could also interfere with the reception of the transmission from node A 305-A at the node B 305-B (not shown)

In one embodiment of the present invention, in order to optimize network communications, the scheduled access advertisements (i.e. the Tx-Rx reports) are broadcast by a given device based upon the transmit and/or the receive beamforming modes to be used by that device the during the reserved time. Note that the transmit and receive beams may be formed via switched sectored antennas or via adaptive arrays.

Figure 5:
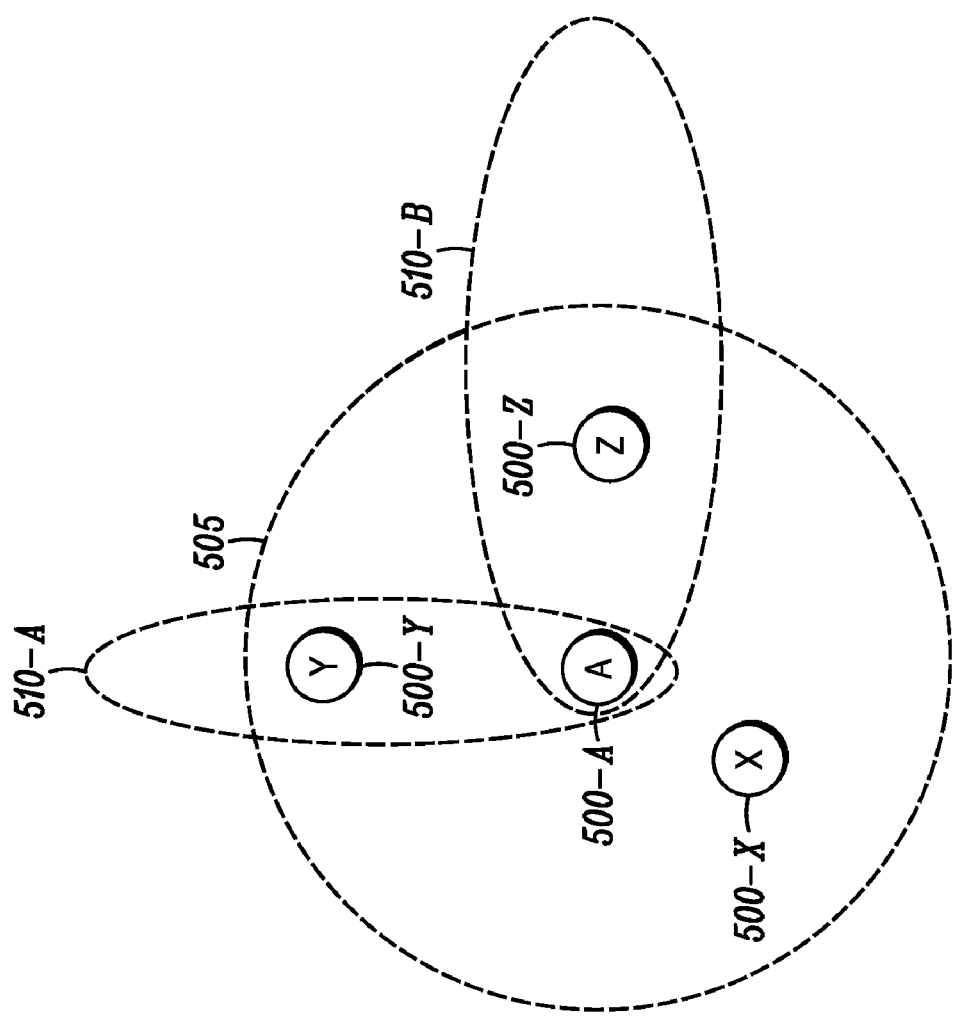
FIG. 5 illustrates communication among nodes within the communication network of FIG. 1 in accordance with some embodiments.

FIG. 5 illustrates communication among nodes within the communication network of FIG. 1 in accordance with some embodiments. Since there are several different combinations of transmit and receive antenna hardware, for example purposes only, the topology of FIG. 5 will be utilized. As illustrated in FIG. 5, node A 500-A broadcasts advertisements for scheduled transmissions with nodes X 500-X, Y 500-Y, and Z 500-Z. As illustrated node A has an omni directional coverage area 505 and two different directional beamforming coverage areas 510-A and 510-B.

In accordance with the present invention, a number of configuration options can be implemented, all a function of the transmit and/or the receive beamforming modes to be used by a device during the reserved time advertised in the Tx-Rx report.

In one configuration, when advertising schedules during which omni-directional transmission and reception will be used, the schedule is broadcasted omni-directionally. In the example scenario of FIG. 5, this provides protection from interference between node A 500-A and other nodes within the omnidirectional range 505.

In another configuration, schedules for beamformed transmissions and omni-directional reception are all broadcast omni-directionally, but in this case each scheduled beamformed transmission is also advertised on the beam that will be used for that transmission. The omni-directional broadcast advertisements prevent neighboring nodes from transmitting during the reserved time which provides self-protection against interference (from nodes within the green area) during omni-directional reception. The directional broadcasts provide protection to other nodes that are within a directional beam 510 A and 510-B of FIG. 5 but outside of omni-directional coverage 505 by preventing them from communicating or setting up new reservations when they would experience interference from the beamformed transmissions using that beam. In the example scenario of FIG. 5, only reservations with node Z 500-Z are advertised within the directional beam coverage area 510-B and only reservations with node Y 500-Y are advertised within the directional beam coverage area 510-A.

In another configuration of the present invention, schedules for omni-directional transmissions and beamformed reception are all broadcast omni-directionally and selectively on the respective beams, just as in the previous case. In this case the omni-directional broadcasts instruct the neighboring nodes (within the omni-directional coverage range 505) not to set up new reservations during omni-directional transmissions while the directional broadcasts provide protection during receive-beamforming by preventing nodes within receive-beamforming range (directional beam forming coverage areas 510-A and 510-B) from transmitting. Note that we are assuming the transmit and receive beamforming gain patterns are the same, which is typically the case for directional antenna and beamforming implementations.

In another configuration of the present invention, schedules for beamformed transmission and reception are only broadcast on the respective beams. This scheme provides protection to nodes within the transmit beams (directional beam coverage areas 510-A and 510-B) preventing them from communicating or setting up new reservations during beamformed transmissions and prevents other nodes within the receive beam from transmitting (given the beam pattern reciprocity described previously). This allows spatial re-use for neighboring nodes within omni-directional range but outside of the transmit/receive beams.

Figure 6:
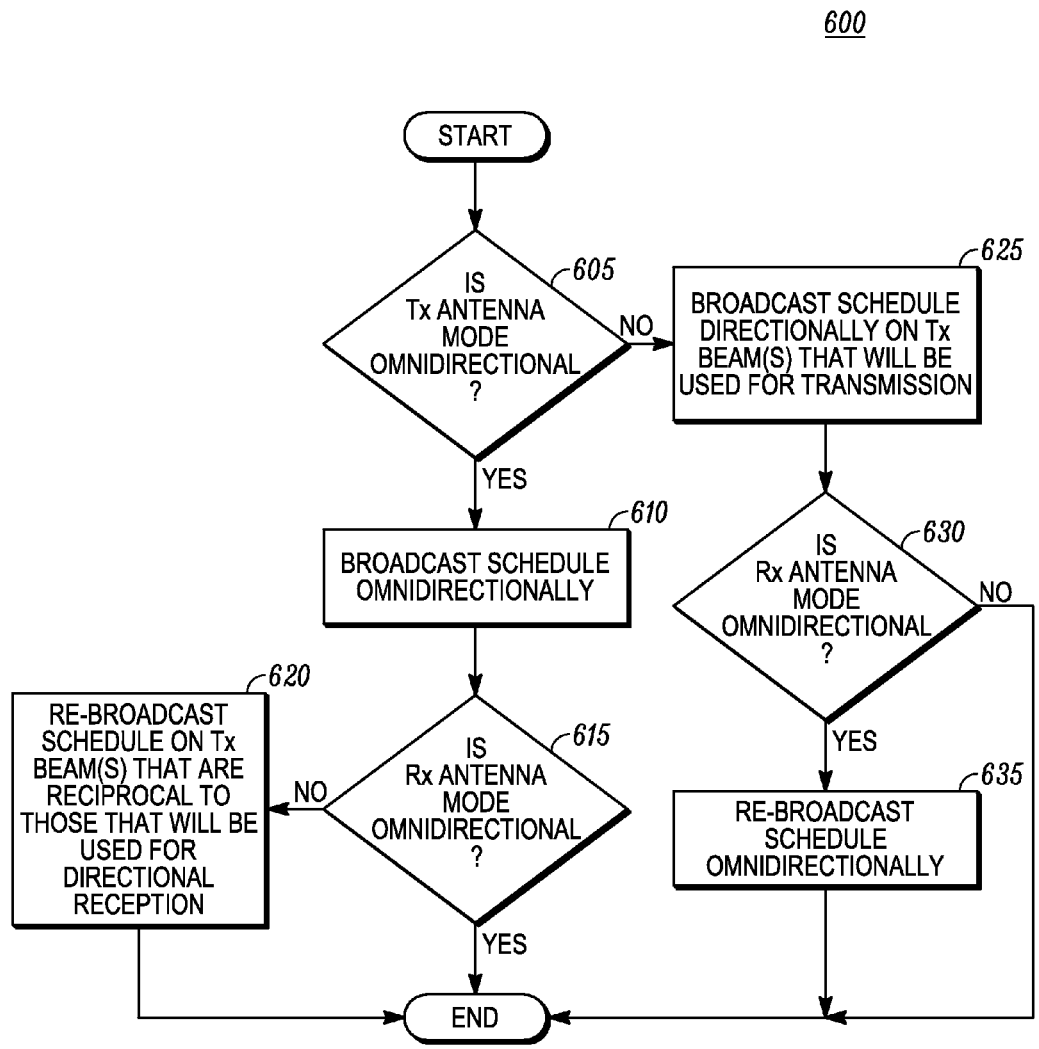
FIGS. 6-8 are flowcharts illustrating the operation of the node of FIG. 2 in accordance with some embodiments.

FIG. 6 is a flowchart illustrating the operation 600 of a node within a wireless communication system for advertisement of a scheduled transmission, in accordance with a first embodiment. As illustrated, the operation begins with Step 605 in which an originator node of a scheduled transmission determines whether or not its transmit antenna mode is omni-directional. When its transmit antenna mode is omni-directional, the operation continues to Step 610 in which the node broadcasts its schedule omni-directionally. Next, in Step 615, the originator node determines whether or not its receive antenna mode is omni-directional. When its receive antenna mode is not omni-directional, the operation continues to Step 620 in which the originator node re-broadcasts the transmission schedule on one or more transmitter beams that are reciprocal to those that will be used for directional reception. Next, and when the receive antenna mode is omni-directional, the operation ends.

Returning to Step 605, when the transmit antenna is not omni-directional, the operation continues to Step 625 in which the originator node broadcasts its transmission schedule directionally on one or more transmitter beams that will be used for transmission. Next, in Step 630, the originator node determines whether or not its receive antenna mode is omni-directional. When its receive antenna mode is omni-directional, the operation continues to Step 635 in which the originator node re-broadcasts its transmission schedule omni-directionally. Next, and when its receive antenna mode is not omni-directional, the operation ends.

It will be appreciate that although only one iteration of the operation is described in FIG. 6, the operation described herein can be periodically performed within one or more nodes in a wireless communication network.

Table 1 summarizes the broadcast behavior for advertising each reservation as a function of the broadcaster's transmit and receive beamforming modes for that reservation as previously described and illustrated in FIG. 6.

TABLE 1

Advertisement Behavior Matrix

| Tx Antenna Mode | Rx Antenna Mode | Omni-Advertisements | Directional-Advertisements |
|---|---|---|---|
| Omni | Omni | X | |
| Beamforming | Omni | X | X |
| Omni | Beamforming | X | X |
| Beamforming | Beamforming | | X |

For the advertisement of scheduled transmissions where the broadcasting node is neither the sender nor the receiver (SMA interference reports), it is not practical for the node to obtain and interpret the beamforming mode and antenna pattern for the scheduled transmission. Therefore, if a node has to advertise such information the broadcast will be made using a antenna mode that covers the entire service area of a node (i.e. generally omni-directional).

Figure 7:
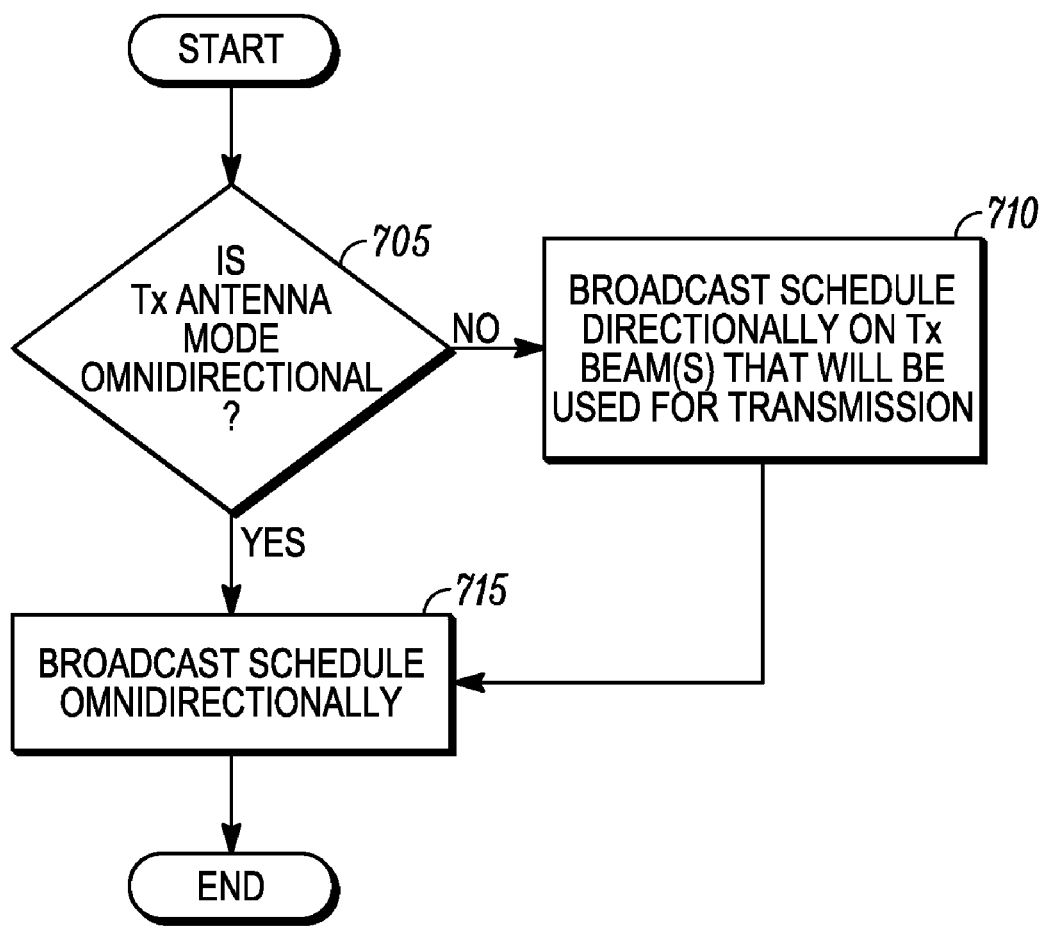

FIG. 7 is a flowchart illustrating the operation 700 of a node within a wireless communication system for advertisement of a scheduled transmission, in accordance with a second embodiment. As illustrated, the operation begins with Step 705, in which an originator node determines whether or not its transmit antenna mode is omni-directional. When its transmit antenna mode is not omni-directional, the operation continues to Step 710 in which the originator node broadcasts its schedule directionally on one or more transmit beams that will be used for transmission. Next, and when its transmit antenna mode is omni-directional, the originator node broadcasts its schedule omni-directional. The operation then ends. This scheme is similar to the first embodiment but disregards the originator node's Rx Antenna mode. This scheme might simplify the implementation, but it could reduce spatial reuse at times when the node broadcasting the reservation is using receive-beamforming.

It will be appreciate that although only one iteration of the operation is described in FIG. 7, the operation described herein can be periodically performed within one or more nodes in a wireless communication network.

The advertisement behavior matrix for the operation described and illustrated in FIG. 7 is shown in Table 2.

TABLE 2

Advertisement Behavior Matrix

| Tx Antenna Mode | Omni-Advertisements | Directional-Advertisements |
|---|---|---|
| Omni | X | |
| Beamforming | X | X |

Figure 8:
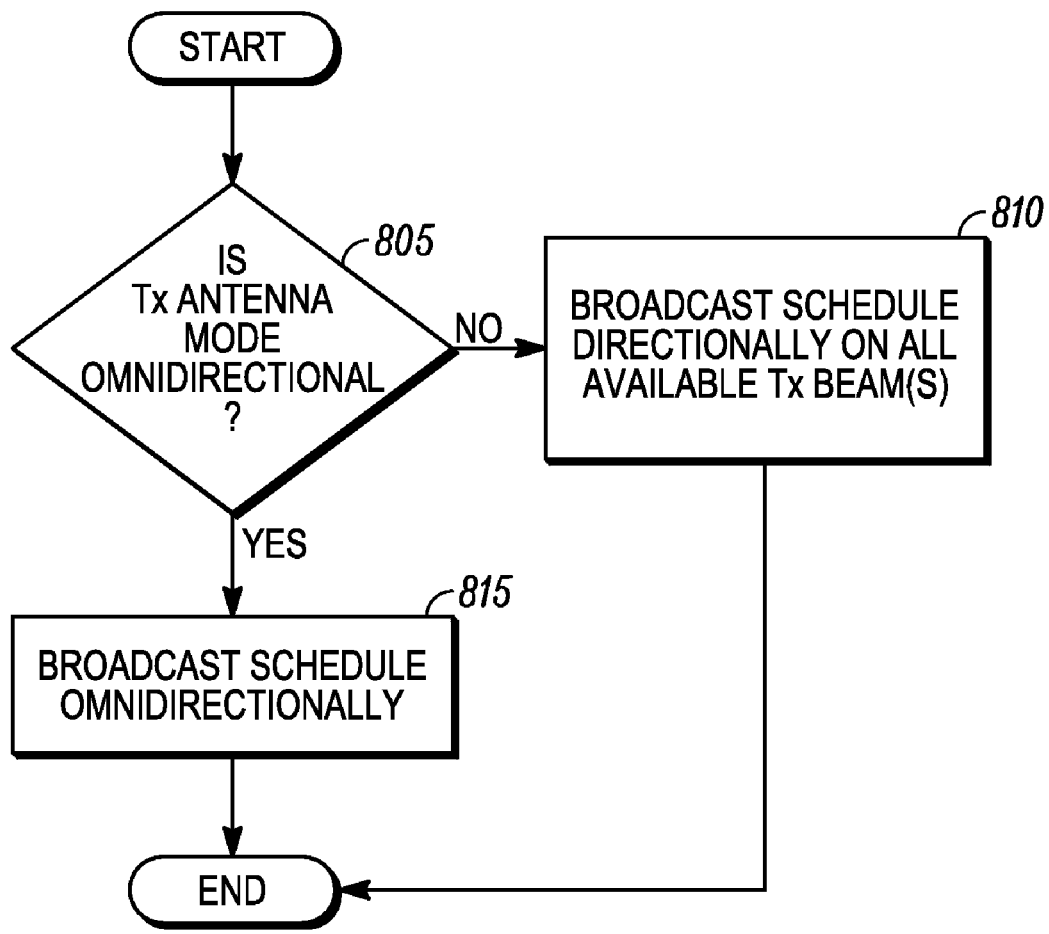

FIG. 8 is a flowchart illustrating the operation 800 of a node within a wireless communication system for advertisement of a scheduled transmission, in accordance with a third embodiment. As illustrated, the operation begins with Step 805, in which an originator node determines whether or not its transmit antenna mode is omni-directional. When its transmit antenna mode is not omni-directional, the operation continues to Step 810 in which the originator node broadcasts its schedule directionally on all available transmit beams. The operation then ends. Alternatively, when its transmit antenna mode is omni-directional in Step 805, the operation continues to Step 815 in which the originator node broadcasts its schedule omni-directional. The operation then ends.

It will be appreciate that although only one iteration of the operation is described in FIG. 8, the operation described herein can be periodically performed within one or more nodes in a wireless communication network.

In this third embodiment as previously described and illustrated in FIG. 8, for all the reservations employing a beamforming technique (Tx antenna mode), the originator node will advertise all of those reservations on any beam used by one or more reservation. Referring back to the example scenario of FIG. 5, this means that node A 500-A would advertise the reservations to nodes Y 500-Y and Z 500-Z on both the beams 510-A and 510-B. No omni-directional advertisement is used for those beamforming reservations. The drawback is that it could significantly reduce spatial reuse. The advertisement behavior matrix for the approach of FIG. 8 is shown in Table 3.

TABLE 3

Advertisement Behavior Matrix

| Tx Antenna Mode | Omni-Advertisements | Directional-Advertisements |
|---|---|---|
| Omni | X | |
| Beamforming | | X (advertise all the reservations using all beam patterns) |

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for operating a node to transmit packets in a wireless communication network comprising:
   determining a transmit antenna mode for a transmission between the node and at least one other node;
   when the transmit antenna mode is omni-directional:
      broadcasting a transmission schedule for the transmission omni-directionally, wherein the transmission schedule provides reserved intervals of time for the node or one or more neighboring nodes to transmit and/or receive traffic and preventing one or more other nodes from communicating or setting up new reservations for the reserved intervals of time, and determining a receive antenna mode for the transmission between the node and the at least one other node, and when the receive antenna mode is beamforming directional, re-broadcasting the transmission schedule on one or more transmitter beams, wherein the one or more transmitter beams are reciprocal to transmitter beams for directional reception of one or more communications between the node and the at least one other node, further wherein the transmission schedule provides reserved intervals of time for the node or one or more neighboring nodes to transmit and/or receive traffic;

when the transmit antenna is beamforming directional, broadcasting a transmission schedule for the transmission directionally on one or more transmitter beams, wherein the transmission schedule provides reserved intervals of time for the node or one or more neighboring nodes to transmit and/or receive traffic and preventing one or more other nodes from communicating or setting UP new reservations for the reserved intervals of time; and periodically performing the determining and broadcasting operations for the transmit antenna mode and the receive antenna mode.

2. The method of claim 1, wherein the one or more transmitter beams comprise transmitter beams identified for transmission of one or more communications between the node and the at least one other node.

3. The method of claim 1, wherein the one or more transmitter beams comprise available transmitter beams within the wireless communication network.

4. The method of claim 1, further comprising when the transmit antenna mode is beamforming directional:

determining a receive antenna mode for the node; and when the receive antenna mode is omni-directional, re-broadcasting the transmission schedule omni-directionally, wherein the transmission schedule provides reserved intervals of time for the node or one or more neighboring nodes to transmit and/or receive traffic.

5. The method of claim 1, further comprising:

periodically performing the determining and broadcasting steps.

6. The method of claim 4, further comprising:

periodically performing the determining and broadcasting steps for the transmit antenna mode and the receive antenna mode.

7. The method of claim 1 wherein the wireless communication network is a wireless local area Mesh Network.

8. The method of claim 1, wherein the broadcasting of the transmission schedule comprises advertising the transmission schedule, wherein the transmission schedule provides reserved intervals of time for the node or one or more neighboring nodes to transmit and/or receive traffic.

* * * * *